US007415696B2

(12) United States Patent
Cohen et al.

(10) Patent No.: US 7,415,696 B2
(45) Date of Patent: *Aug. 19, 2008

(54) EXTENSIBLE HELP FACILITY FOR A COMPUTER SOFTWARE APPLICATION

(75) Inventors: Gary B. Cohen, San Diego, CA (US); Michael J. Leavy, Poway, CA (US); Michael D. Scarafone, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 11/293,528

(22) Filed: Dec. 2, 2005

(65) Prior Publication Data

US 2006/0080607 A1 Apr. 13, 2006

Related U.S. Application Data

(63) Continuation of application No. 09/966,806, filed on Sep. 28, 2001, now Pat. No. 7,024,658.

(51) Int. Cl.
 *G06F 9/44* (2006.01)
(52) U.S. Cl. .................. 717/100; 715/705; 715/708
(58) Field of Classification Search .................. 717/100; 715/705, 708, 709, 701
 See application file for complete search history.

(56) References Cited

U.S. PATENT DOCUMENTS

| 5,361,361 | A | | 11/1994 | Hickman et al. |
|---|---|---|---|---|
| 5,436,637 | A | | 7/1995 | Gayraud et al. |
| 5,481,712 | A | * | 1/1996 | Silver et al. .................. 717/109 |
| 5,550,967 | A | | 8/1996 | Brewer et al. |
| 5,596,752 | A | | 1/1997 | Knudsen et al. |
| 5,737,608 | A | * | 4/1998 | Van De Vanter ............ 717/112 |
| 6,182,277 | B1 | | 1/2001 | DeGroot et al. |
| 6,259,445 | B1 | | 7/2001 | Hennum et al. |
| 6,467,081 | B2 | * | 10/2002 | Vaidyanathan et al. ...... 717/123 |
| 6,542,899 | B1 | * | 4/2003 | Saulpaugh et al. ...... 707/103 R |
| 6,658,646 | B1 | | 12/2003 | Hernandez, III |
| 6,687,485 | B2 | * | 2/2004 | Hopkins et al. .............. 434/350 |
| 6,690,390 | B1 | * | 2/2004 | Walters et al. ................ 715/705 |
| 6,711,557 | B1 | * | 3/2004 | Palaniappan .................. 706/45 |
| 6,772,110 | B2 | * | 8/2004 | Real et al. ........................ 704/8 |
| 6,850,259 | B1 | * | 2/2005 | Rzepkowski et al. ......... 715/835 |
| 6,871,322 | B2 | * | 3/2005 | Gusler et al. ................. 715/708 |
| 7,016,944 | B1 | * | 3/2006 | Meyer et al. ................. 709/218 |
| 7,032,179 | B2 | * | 4/2006 | Mack et al. .................. 715/762 |

(Continued)

OTHER PUBLICATIONS

Coherent User Interfaces for Language-Based Editing Systems, Michael L. Van De Vanter, et al., 1996, pp. 19-69.*

(Continued)

*Primary Examiner*—Todd Ingberg
(74) *Attorney, Agent, or Firm*—Fish & Richardson P.C.

(57) ABSTRACT

Content obtained from a help file containing at least two interactive links in a sequence may be displayed in a help facility. Each interactive link may be associated with at least one user-activated step in a computer software application to perform in connection with a help topic according to the sequence so that once a user activates one of these links out of sequence, an operation in the computer software application may be invoked to effect the at least one user-activated step.

32 Claims, 13 Drawing Sheets

U.S. PATENT DOCUMENTS 7,051,279 B2 * 5/2006 Simonyi .................. 715/705
7,089,541 B2 * 8/2006 Ungar .................... 717/143
7,137,135 B2 * 11/2006 Schein et al. ............. 725/40

OTHER PUBLICATIONS

"Practicval Language-Based Editing for Software Engineers", Michael L. Van De Vanter, pp. 252-267, 1995.*

"The Cornell Program Synthesizer: A Suntax-Directed Programming Environment", Tim Teitelbaum et al, ACM, 1981, pp. 563-573.*

Automatic Generation of Help from Interface Design Models, Roberto Moriyon et al, ACM, 1994, pp. 225-231.*

"Online Help in the Real World", Susan D. Goodall, ACM, 1991, pp. 21-29.*

Automatic Generation of Textual, Ausio, and Animated Help om UIDE: The User Interface Design Environment, Piyawadee Noi Sukaviriya et al, ACM, 1994 pp. 44-52.*

"Automatic Generation of Task-Oriented Help", S. Pangoli et al, UIST, Nov. 1995, pp. 181-187.*

Adobe PhotoDeluxe Home Edition 3.0 Getting Started Guide, 1998, Adobe Systems incorporated, 8 pages.

Microsoft Windows98 Second Edition Help System, 1999, 2 pages.

http//graphicssoft.about.com/cs/photoshopationtip/, Photoshop Action Tips—using managing debugging and troubleshooting Photoshop actions, printed Sep. 12, 2001 17 pages.

Apple Guide Complete: Designing and Developing Onscreen Assistance, Addison-Wesley Publishing company, 563 pages, 1995.

"?" A Context Sensative Help System Based on Hypertext, Willilam Lee, ACM, 1987, pp. 429-435.

"Context and Orientation in Hypermedia Networks", Kenneth Utting et al, ACM, 1989, pp. 58-84.

The Kiewet Network: A Large Apple Talk Internetwork, ACM, 1988, pp. 15-26.

Creating an HTML Help System for Web-based Products, Laura Rintjema et al, ACM, 1996, pp. 227-233.

Familiar Contexts, New Technologies: Adapting Online Help to Simulate an Expert System, Hilari K. Jones, ACM, 1997, pp. 145-151.

Intergrating Online Help Documentation and Training, R. Stanley Dicks, ACM, 1994, pp. 115-118.

Online Help Exploring Static Information or Constructing Personal and Collaborative Solutions Using Hpertext, D. Selfe et al, ACM 1992, pp. 97-101.

Online Help Systems: Design and Implementation Issues (PANEL), ACM, 1988, pp. 287-288.

CogentHelp: A Tool for Authoring Dynamically Generated Help for JAVA Guis, David E. Caldwell et al, ACM, 1997, pp. 17-22.

The Birth of A Help System, Hans Bergman et al, ACM, 1985, pp. 289-295.

Using the Technology You Support Automating the HelpDesk, Robert E. Diem et al, ACM 1998, pp. 97-104.

Alternatives for Online Help Systems, T.P. Kehler et al, ACM, 1980, pp. 99-103.

PAL: An Intelligent Help System, Jane Silbert, ACM, 1990, pp. 882-889.

Information Retrieval Using A Hyperlink Based Help System, F.R. Campagnoni et al, ACM, 1989, pp. 271-291.

Knowledge Based Help Systems, Gerhard Fischer et al, ACM, 1985 pp. 161-167.

ForeHelp by ForeFron, Incorporated User's Guide Version 1.0, 1994, pp. 1-246.

Borland Languages Help Compiler, Borland Corporation, 1991, pp. 1-88.

Developing Applications with Office, Christine Solomion, Microsoft Press, Chapter 13, 1995.

* cited by examiner

US 7,415,696 B2

EXTENSIBLE HELP FACILITY FOR A COMPUTER SOFTWARE APPLICATION

CROSS-REFERENCE TO RELATED APPLICATIONS

The present application is a continuation of U.S. patent application Ser. No. 09/966,806, now U.S. Pat. No. 7,024,658 filed on Sep. 28, 2001, entitled "Extensible Help Facility For A Computer Software Application," which is incorporated herein in its entirety.

TECHNICAL FIELD

The present application relates to a help facility for a computer software application.

BACKGROUND

Many computer software applications, such as word processors, image editors, spreadsheets, email clients, and the like, include a help facility to aid users in performing discrete operations and/or comprehensive tasks in the application. Help facilities come in many different forms including wizards, which present a sequence of steps for a user to perform to accomplish a particular task, context-sensitive help systems, which automatically display help topics relevant to the current state of the application, and conventional text-based help systems which present a user with an index that can be manually searched to look for a help topic of interest.

FIG. 1 shows a screenshot of a help facility for Adobe Acrobat®—an application for viewing, editing and creating documents in the Portable Document Format (PDF). As shown in FIG. 1, a user of the Acrobat application would be presented with a window 100 within a graphical user interface (GUI) that includes a menu bar 104 providing access to various drop-down menus, various graphical buttons 103 that, when selected, place the application in different modes and/or provide the user with access to different tools, and a workspace 105 for displaying sub-windows containing PDF documents. In this screenshot, the workspace 105 includes two sub-windows—one to display a PDF document 102 (manual.pdf), which for example the user is viewing or editing, and another window to display a PDF document 106 (Acrohelp.pdf), which is a guide containing the help information for the application. The user may invoke the help system, thereby bringing up the help document 102, by selecting the Help menu item on the menu bar 104.

Once opened, the user can navigate the help guide using various different mechanisms. For example, the user can scroll through the help guide as if reading a book by using the scrolling controls 113 for the window 106. Alternatively, the user can select a particular bookmark, such as "Annotating PDF Documents" bookmark 108, which will cause a corresponding help page 110 to be presented to the user. The user also can jump to desired locations within the help guide by selecting (e.g., clicking on) links with a help page, such as link 112 in page 110. The link 112 points to another page (for example, "Using the annotation tools") within the help guide and, upon being clicked, causes that page to be displayed in the window 106. In any event, the user can peruse the help guide to gather information about how to use various features of the application to perform operations and tasks.

SUMMARY

The present inventors recognized that conventional help systems tended to be difficult or inflexible to extend, and/or limited in the ability to instruct users how to operate the application. Consequently, the present inventors developed a help facility that is easily and flexibly extendible, easy to use, and provides intelligent and interactive interoperability with the application for which help is being sought.

Implementations of the help facility described here may include various combinations of the following features.

In one aspect, a help facility for a computer software application is provided by enabling an author to generate one or more help files that specify content to be displayed and at least one interactive link (e.g., a hyperlink, a hotspot or a graphical button) that, when activated, performs an operation in the computer software application associated with the specified content. The help facility is enabled to access, while executing, the generated one or more help files upon detecting that the one or more help files exist in a predetermined location within a local file structure accessible to the help facility.

Prior to enabling the help facility to access the generated help file, the help file may be placed in the predetermined location in the hierarchical file structure, for example, either by the author of the help file or automatically by a software process. The generated help files may be retrieved from an external source, for example, a remote resource on a network or a removable storage medium.

Enabling the help facility to access the help files may include displaying the one or more help files as a help page in the help facility. Alternatively, or in addition, enabling the help facility to access the generated one or more help files may include causing the help facility to traverse the local file structure to identify existing help files. The help facility may dynamically generate a listing of available help topics, and/or a table of contents file, based on help files identified during traversal. The help facility may be caused to detect the existence of one or more help files in response to a user action or automatically, for example, when a change in a help file or the addition of a new help file is detected.

Enabling an author to generate one or more help files may include enabling the author to record a sequence of one or more user activities performed in the computer software application. Alternatively, or in addition, enabling the author to generate one or more help files may include providing a markup language extension that enables an activity in the computer software application to be performed indirectly.

The operation in the computer software application associated with the interactive link may be an atomic step of a complex operation or may involve a plurality of steps associated with a complex operation. Moreover, the operation in the computer software application associated with the interactive link may correspond to a menu item in a graphical user interface of the computer software application or may correspond to an operation available through an application program interface of the computer software application.

In another aspect, a help facility for a computer software application may be provided by enabling a computer software application to record a sequence of one or more user operations performed within the computer software application, and enabling a user to generate one or more help files that that specify help content to be presented and at least one interactive link that, when activated, performs the recorded sequence of one or more operations. The generated help files may be displayed as a help page in the help facility.

The help facility may be enabled to access the generated one or more help files, while executing, upon detecting that the one or more files exist in a predetermined location within a local file structure accessible to the help facility. In response to user input, the help facility may selectively perform the one or more operations associated with the interactive link based on a state of the computer application. Such selective performance of the one or more operations may, for example, involve refraining from attempting to perform an operation if the computer software application is in an improper state for performing the operation. The help facility further may inform the user of one or steps to undertake to place the computer software application in a proper state to perform the operation.

In another aspect, a help facility for a computer software application may be controlled by enabling a user to generate one or more help files that specify content to be presented and at least one interactive link that, when activated, performs an operation in the computer software application associated with the content. The help facility is enabled to detect a state of the computer software application and to selectively cause the operation to be performed by the computer software application based on the detected state. The help facility may refrain from causing the operation to be performed if the computer software application is in improper state for performing the operation. Moreover, the user may be information of one or steps to undertake to place the computer software application in a proper state to perform the operation.

In another aspect, an extensible help facility for a computer software application may include a graphical user interface for communicating with a user, help files arranged in a hierarchical file structure, and software processes configured to perform operations such as (i) enabling a user to generate or modify help files that specify content to be displayed and include an interactive link that, when activated, performs an operation in the application associated with the specified content, (ii) causing the help facility, while executing, to access the generated help files upon detecting that the help files exist in a predetermined location within the hierarchical file structure, and/or (iii) causing the help facility to detect a state of the computer software application and to selectively cause an operation corresponding to an interactive link to be performed by the computer software application based on the detected state.

One or more of the following advantages may be provided. The systems and techniques described here may result in a help facility that can be easily extended using standard document formats (e.g., HTML, PDF, MS Word, etc.) and standard editing environments, which, for example, do not require extensive programming experience or knowledge of the help facility's application program interface (API). Moreover, the help facility may be able to recognize and access newly generated or newly retrieved help files without having to re-start the help facility or its associated application. The help files that the help facility uses are able not only to display instructive content (e.g., text) to the user, but also can include interactive links (e.g., hyperlinks, hotspots or graphical buttons) that, when activated, cause the help facility to drive the application (that is, perform one or more operations in the application). By doing so, the help facility may provide an enhanced ability to explain to the user the individual steps involved in accomplishing a particular task. Accordingly, help files can be generated, retrieved and/or modified to customize the help facility to a specific user, environment, or context. Moreover, by examining the application's current state before attempting to drive the application, the help facility can provide intelligent interoperability with the application such that, for example, the help facility will refrain from instructing the application to perform operations that are inappropriate or impossible based on the application's current state.

Details of one or more embodiments are set forth in the accompanying drawings and the description below. Other features, objects, and advantages will be apparent from the description and drawings, and from the claims.

DRAWING DESCRIPTIONS

Details of one or more embodiments are set forth in the accompanying drawings and the description below. Other features and advantages will be apparent from the description and drawings, and from the claims.

DETAILED DESCRIPTION

Figure 1:
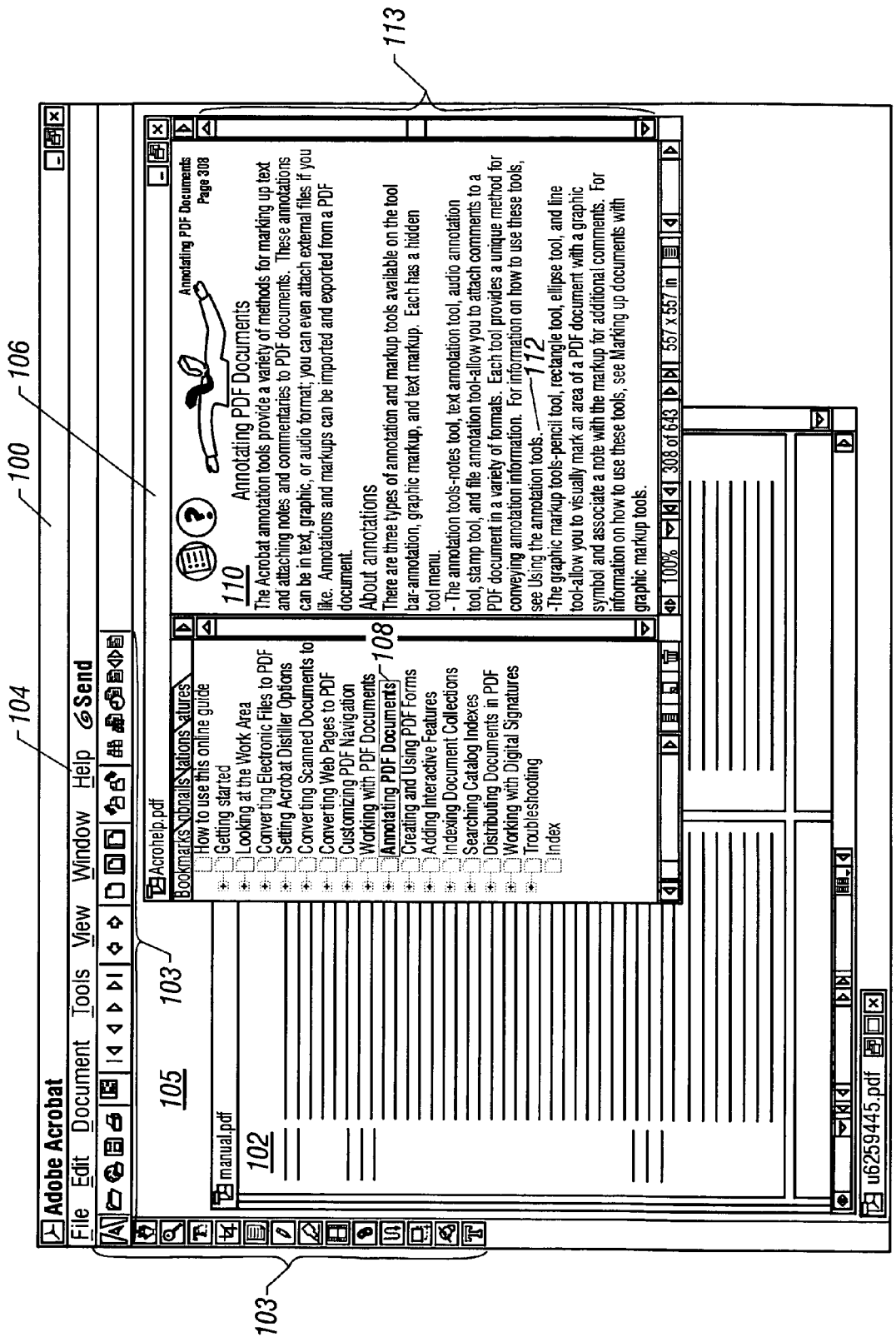
FIG. 1 is a screenshot of an application with a help guide window.
Figure 2:
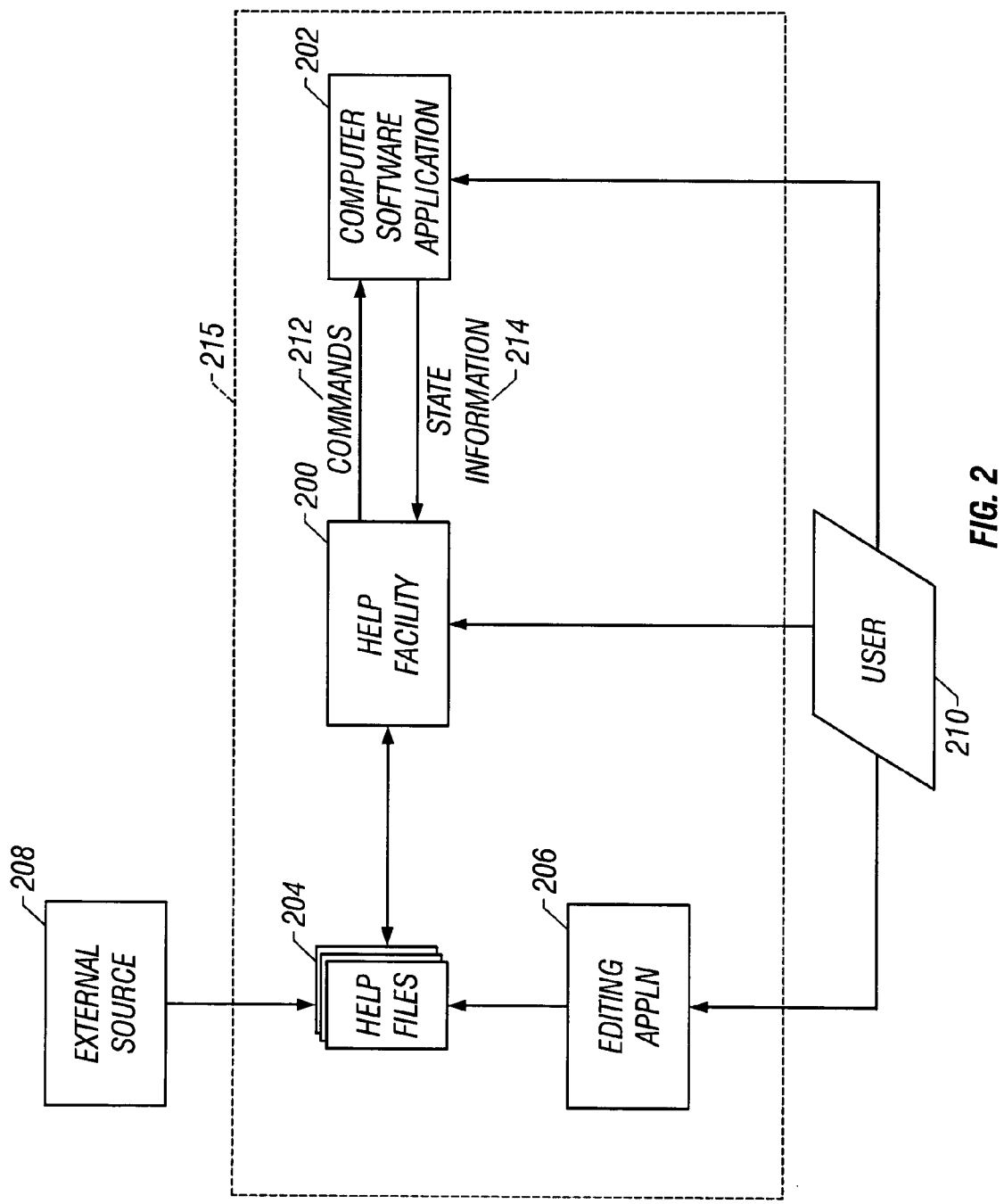
FIG. 2 is a block diagram of an extensible help facility that can interact with a computer application.

FIG. 2 is a block diagram of an extensible help facility 200 that can interact with a computer software application 202. The help facility 200 and the computer software application may reside and execute on the same computer system platform 215, for example, a personal computer running an operating system such as Microsoft Windows or Apple Mac OS. The help facility 200, which can be implemented as a separate program or, can be embedded partially or entirely in the computer software application 202, can provide commands 212 or other instructions to the application in order to "drive" the application—that is, to perform operations in the application 202. These operations can be operations that are available through the application's GUI, for example, such as those made available to a user through menu items, graphical buttons, and the like, or they can be "built-in" operations, which typically are not available or transparent to users, but rather can be invoked only through the application's API. Moreover, the help facility 200 can cause the application 202 either to perform a single atomic operation or any arbitrary sequence of operations. Depending on the preferences of the system designer, the help facility 200 may be able to access all or only a subset the application's potentially available operations.

The help facility 200 also may be able to collect from the application 202, or otherwise examine, state information 214 relating to the application's current state (e.g., whether a work file is currently open or closed, attributes of the work file, the application's current mode of operation, etc.). As described in more detail below, this state information 214 can be used by the help facility 200 to determine whether the application is in a proper or correct state to perform a particular operation.

A user 210, for example, a human user or an automated entity such as a computer process, can interact with the help facility 200 and/or the application 202 in order to accomplish tasks or learn about how to operate the application 202. When the user 210 interacts with the help facility 200, for example, the user can cause the help facility 200 to selectively display help files 204 having content (e.g., text, images) that instructs the user about how to operate the application 202 and how to use it to accomplish desired goals. The help files 204 also may include one or more interactive links that, when selected or otherwise activated by the user, cause the help facility to send commands 212 to the application to perform a particular operation or set of operations.

The help files 204 may be stored in a predetermined location, for example, in a logical arrangement in a hierarchical file structure local to (e.g., on the same computer system platform 215 as) the help facility 200. Upon being launched and/or refreshed, the help facility 200 may examine the file structure and use the help files that it finds to dynamically build a table of contents of, and pointers to, available help topics for presentation to the user. The user 210 may interact with an editing application 206 (e.g. HTML editor, word processor, or PDF file writer) to create new help files or modify existing help files. These new or modified help files then can be accessed by the help facility 200 upon recognizing the existence of the new help files within the file structure, for example, either automatically, or upon being instructed to refresh the help facility's awareness of the currently available help files. The help files 204 can be generated using standard formats such as HTML, PDF, MS Word, or virtually any other format that supports text or other content display and the ability to embed links to external resources. Alternatively, or in addition, new or modified help files can be received from an external source 208 such as a website accessible through a network connection or a removable medium such as a CD-ROM or floppy disk.

FIGS. 3A-3D are screenshots showing an example of using an interactive help facility, referred to as "Recipes," provided with the Adobe Photoshop Elements® image editing application. A Recipe is a set of instructions that may be followed by a user to learn how to accomplish a task in the application. A Recipe may include not only instructional content such as text that can be read by a user, but also interactive links that, when selected or otherwise activated, may cause an operation to be performed in the application. In one implementation, the instructions provided to the user, as well as any operations for which interactive links may be provided, are purposefully limited to performing atomic operations—that is, single, constituent steps—in the application so that the user gains a detailed understanding of how to perform the task under consideration. However, a Recipe could include instructional steps and/or interactive links that result in two or more operations being performed concurrently, or consecutively, while making their individual details transparent to the user.

Figure 3A:
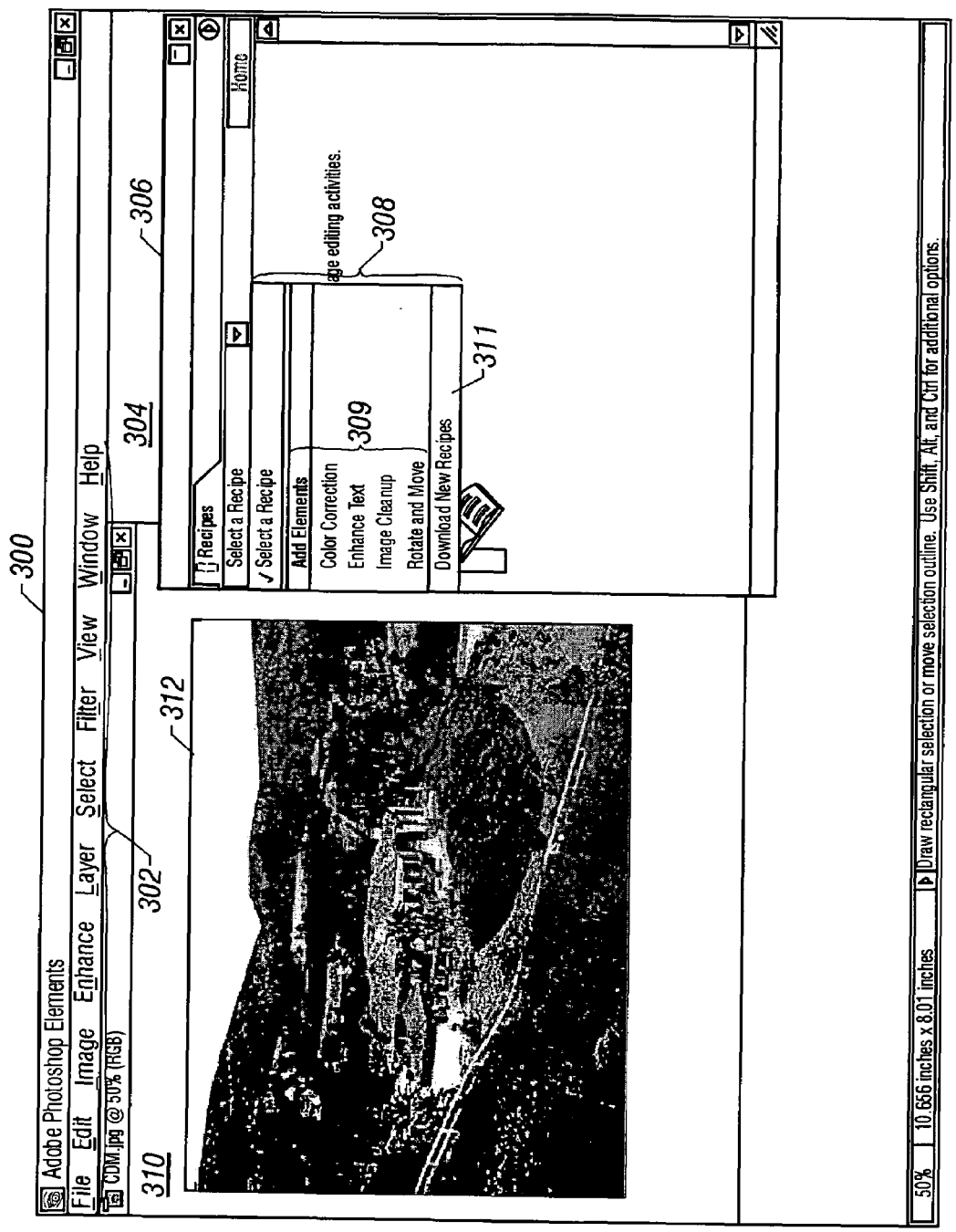
FIGS. 3A-3D are screenshots showing an example of using an interactive help facility.
Figure 3B:
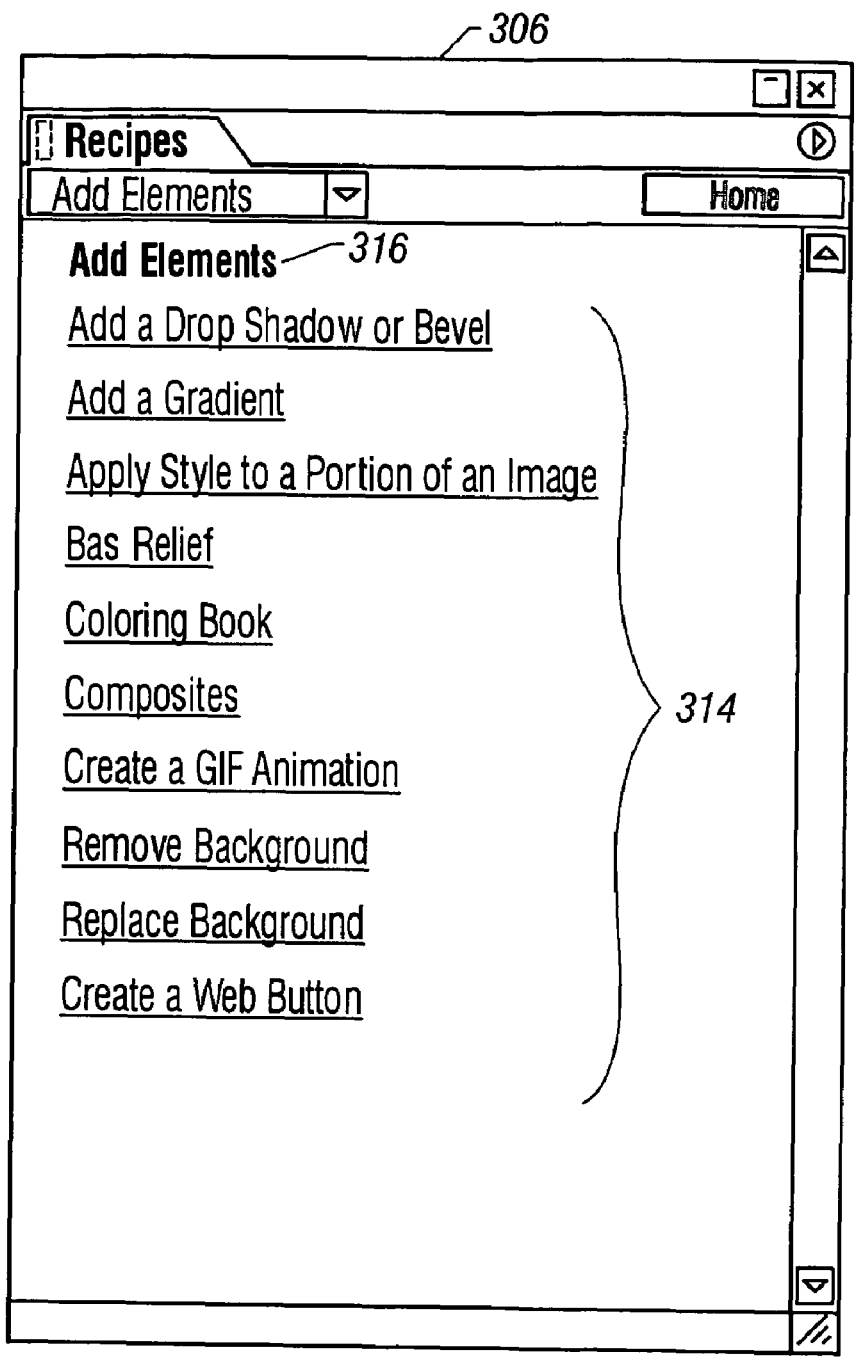

As shown in FIG. 3A, the application window 300 may include a menu bar 302 and a work space 304 in which subwindows can be displayed, such as subwindow 310 in which an image 312 has been opened and displayed. The Recipes help facility is presented in a separate window 306, which need not be bounded by the application window 300 as shown in FIG. 3A, but rather can be moved and resized to appear as a separate window on the computer's desktop. In the implementation shown, the help files are created and stored as standard HTML files and the Recipes window 306 is an instance of a browser that retrieves and displays the HTML-based help files. However, other implementations could use help files in other formats (e.g., PDF, MS Word) and a suitable renderer for rendering help files in the chosen format.

The Recipes window 306 includes a dropdown menu 308 that includes five different Recipe categories 309, each of which contains one or more individual Recipes under that category. The dropdown menu 308 also includes a menu option 311 for downloading new Recipes from a remote source, such as a website accessible on the Internet.

In this example, assume that a user selects the Recipe category "Add Elements" from the dropdown menu 308. In that case, the Recipe window 306 changes its appearance to display the ten different Recipes 314 that fall under the Add Elements category 316. Each of the ten different Recipes 314 is represented as a hyperlink that, when clicked, causes the help facility to jump to an associated help file stored at a specified location in the file structure. For example, if the user clicks the link for the "Add a Drop Shadow or Bevel" Recipe, the Recipe window 306 retrieves the help file pointed at by the HREF associated with that link and displays it as shown in FIG. 3C.

Figure 3C:
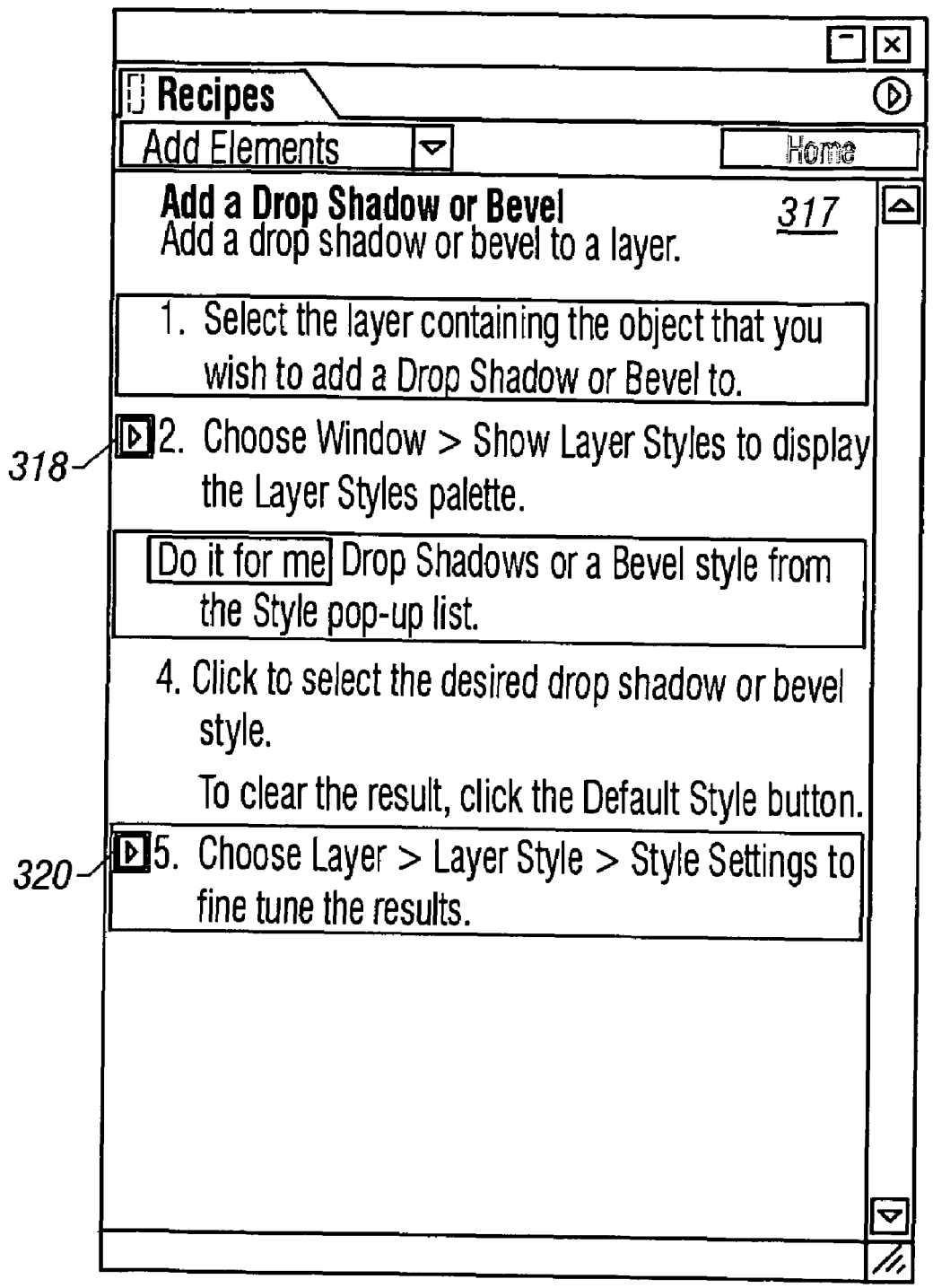

As shown in FIG. 3C, the "Add a Drop Shadow or Bevel" Recipe 317 includes five steps, numbered 1 through five, and two interactive links 318, 320, also referred to as "Do it for me" buttons. The user can now examine and experiment with this Recipe 317 in a non-modal manner. That is, unlike conventional wizards, a Recipe does not constrain the user as to which steps to perform or the order in which they are performed. For example, the user may chose click button 320 before clicking button 318, even though button 320 is associated with step 5 and button 318 is associated with step 2. Or the user may chose to forego clicking either or both of the buttons. As a result of this non-modal behavior, the Recipe help facility provides a user with enhanced flexibility and experimentation opportunities.

Figure 3D:
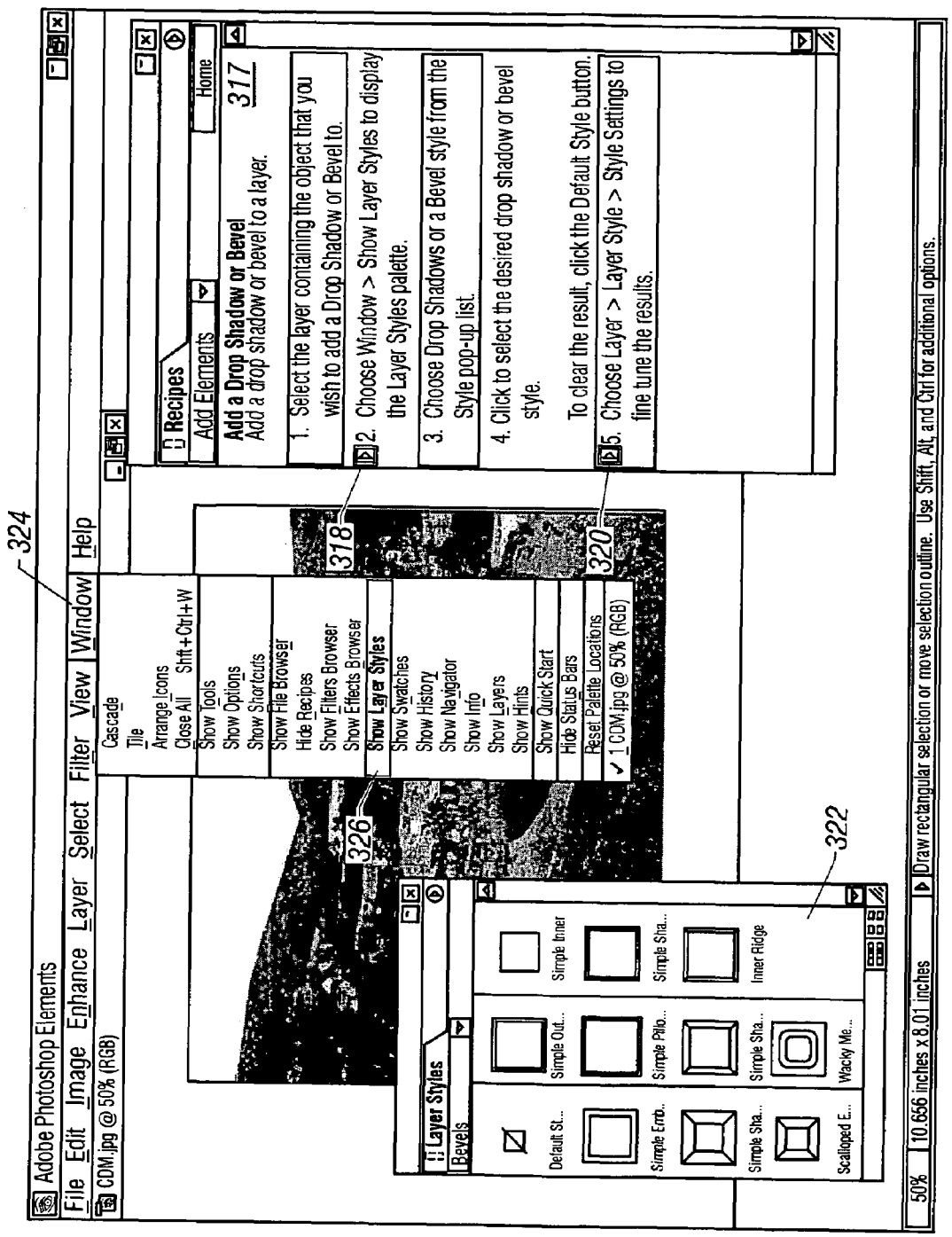

In the typical contemplated interaction with a Recipe, however, the user will read and follow each of the Recipe steps in order, and click the "Do it for me" buttons in the appropriate sequence, in order to learn how to perform the task under consideration—in this example, adding a drop shadow or a bevel to an image. Accordingly, after reading the text associated with steps 1 and 2, a user typically will click "Do it for me" button 318, which will cause the help facility to instruct the application to perform the corresponding function. In this example, as indicated by the text in step 2, clicking button 318 will cause the application to display the "Layer Styles" palette 322 as shown in FIG. 3D. Also as indicated by text accompanying step 2, clicking button 318 has the same effect as if the user had clicked the "Window" menu header from the menu bar and then had moved the cursor down and selected the "Show Layer Styles" menu item 326. Accordingly, by providing users with text describing how to perform steps and with interactive buttons that can perform those steps automatically, the Recipes help facility represents an easy-to-use yet effective tool for learning how to use an application.

In order to allow the interactive links in Recipes help files to cause the application to perform operations, any of three extensions to standard HTML may be used:

PlayAction(<Action set name>, <Action name>)

PlayMenuByName(<unique_menu_item_name>)

PlayBuiltinCommand(<keyword>)

A link in an HTML file can specify one of these extensions as an attribute in order to cause the application to perform one or more specified operations.

PlayAction(<Action set name>, <Action name>) is an HTML extension that enables predefined "Actions" to be performed. As used herein, an "Action" is a type of macro defining a set of one or more application operations. Typically, Actions are implemented as files in a predetermined format and having an ".atn" extension. Both Adobe Photoshop® and Photoshop Elements® provide the ability to play pre-defined Actions and Photoshop® further provides the ability to create new Actions by recording a sequence of user activities. In the example Recipe shown in FIG. 3C ("Add a Drop Shadow or Bevel"), the corresponding HTML file defining that Recipe includes two PlayAction( ) statements—one to invoke the Action associated with "Do it for me" button 318 (i.e., display the Layer Styles palette) and another to invoke the Action associated with "Do it for me" button 320 (i.e., fine tune the style settings). As an example, the format of the first PlayAction( ) statement is as follows:

href=". .\. .\. .\Desktop\PlayAction(photoshop_elements.atn, show_styles)" where "photoshop_elements.atn" is the Action set name, and "show_styles" is the Action name, essentially a pointer to a particular item within the named Action set.

PlayMenuByName(<unique_menu_item_name>) can be specified as an attribute of a link in order to perform an operation corresponding to a specified menu item in the application—that is, any menu item that is accessible to the user through the application's GUI. For example, if a link had the attribute PlayMenuByName(Fresco), the application would perform the same operation on an image as if the user had selected Filter>Artistic>Fresco from the menu bar in the application's GUI.

PlayBuiltinCommand(keyword) can be specified as an attribute of a link in order to perform an operation corresponding to a "built in" application operation—that is, an operation available through the application's API and typically not accessible or visible to the user through the application's GUI.

At initialization, the application loads the HTML renderer/parser used for displaying help files through the help facility (e.g., depending on platform, either Microsoft Internet Explorer for Windows or HTMLRenderingLib for the Apple Mac OS) and registers to be informed whenever the user clicks on a link. In the Apple Mac OS, such registration is accomplished by an API call to RegisterURLToFSSpecCallbackProc(<help facility function>). Consequently, when the renderer/parser detects that a link has been clicked, the specified help facility function is called and the argument(s) are passed. If any of the PlayAction( ), PlayMenuItem( ), or PlayBuiltinCommand( ) attributes have been specified in the link, the help facility function processes the link click. Otherwise, the function simply returns and lets the renderer/parser process the link click.

For example, if the user clicks the "Do it for me" button 318 in FIG. 3C, the HTML renderer/parser, based on the prior registration, calls the specified help facility function with the PlayAction( ) attribute and its associated arguments (Action set name, Action name). If the named Action set exists, the help facility causes the specified Action to be played and the corresponding operations are performed by the application. If the named Action does not exist, the help facility fails gracefully, for example, by presenting a pop-up window to the user stating "The command you are trying to run is unavailable." If the associated help page is located, and being presented to a user, on a remote machine (or server), but the Action set is present locally (i.e., local to the machine or server on which the help facility is executing), the help facility still can drive the application even though the link having the PlayAction( ) attribute originated on a remote machine.

Figure 4:
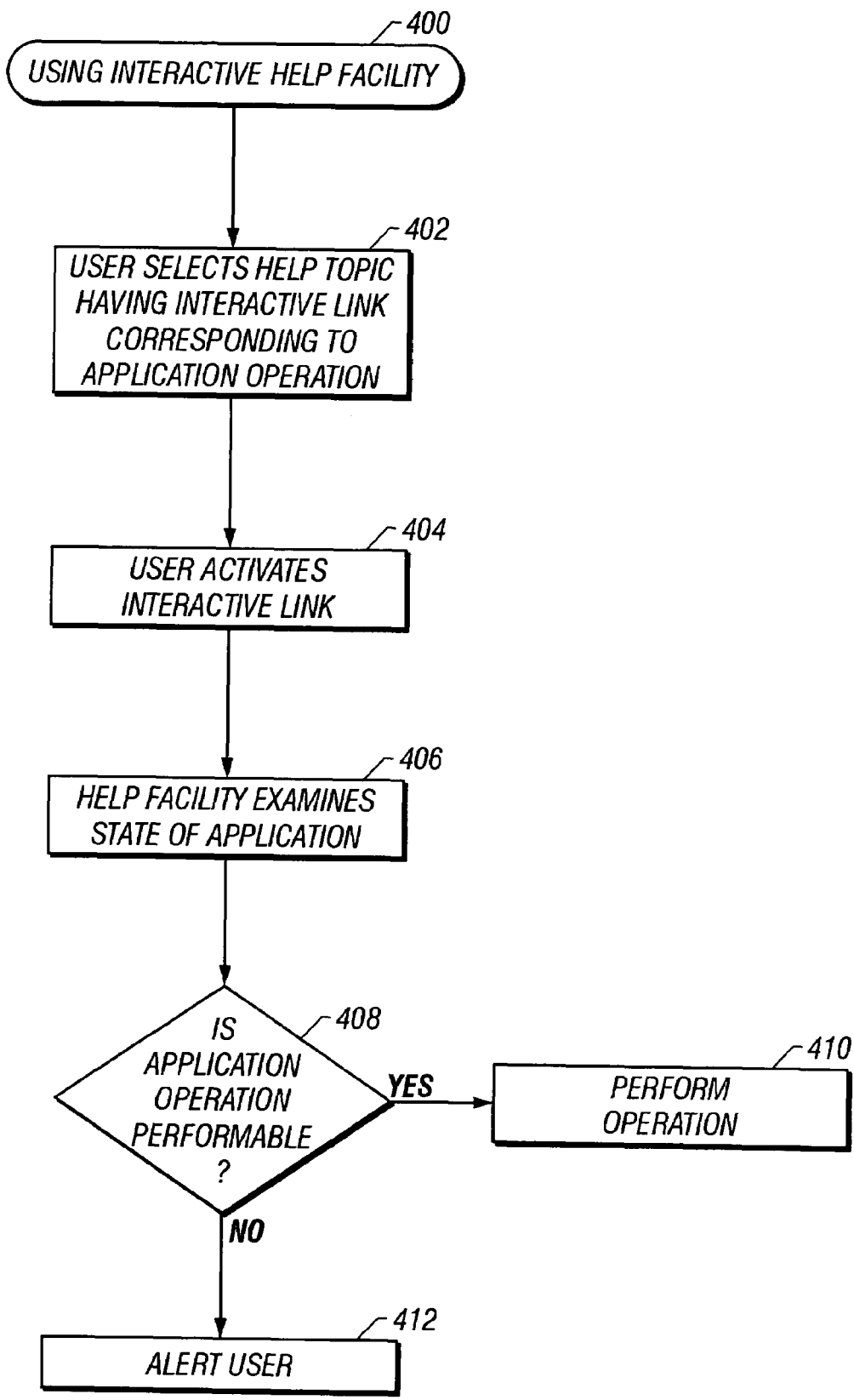
FIG. 4 is a flowchart of a method of using an interactive help facility.

FIG. 4 is a flowchart of a process 400 of using an interactive help facility for an application program. First, a user selects a help topic having an interactive link corresponding to operation of the application (e.g., a Recipe having a "Do it for me" button as shown in FIG. 3C) (402). Next, the user selects or otherwise activates the interactive link, for example, by clicking on a "Do it for me" button in a Recipe (404). Next, the process 400 examines the current state of the application to determine whether the application, and/or a work file on which the application is operating, is in a proper state to perform the one or more operations associated with interactive link (406).

If the process 400 determines based on the state information that the application operation can and/or should be performed, the operation associated with the interactive link is performed (408, 410). On the other hand, if the process 400 determines based on the state information that the application operation cannot and/or should not be performed, the operation associated with the interactive link is not performed and appropriate action is undertaken, for example, the user is alerted (408, 412).

The alert provided to the user either can be a simple notice that the requested operation cannot be performed under the current application state (for example, as shown by popup window 502 in FIG. 5), or the alert can be more elaborate, for example, providing details of why the application's current state prevents performance of the operation and/or listing steps or activities that the user can take to place the application in the correct state for performing the operation associated with the interactive link. In this manner, accordingly, the help facility can fail gracefully when the user requests an application operation not currently performable and potentially can outline corrective measures to place the application in the proper state. As a result, the robustness and instructive value of the help facility may be enhanced.

Figure 5:
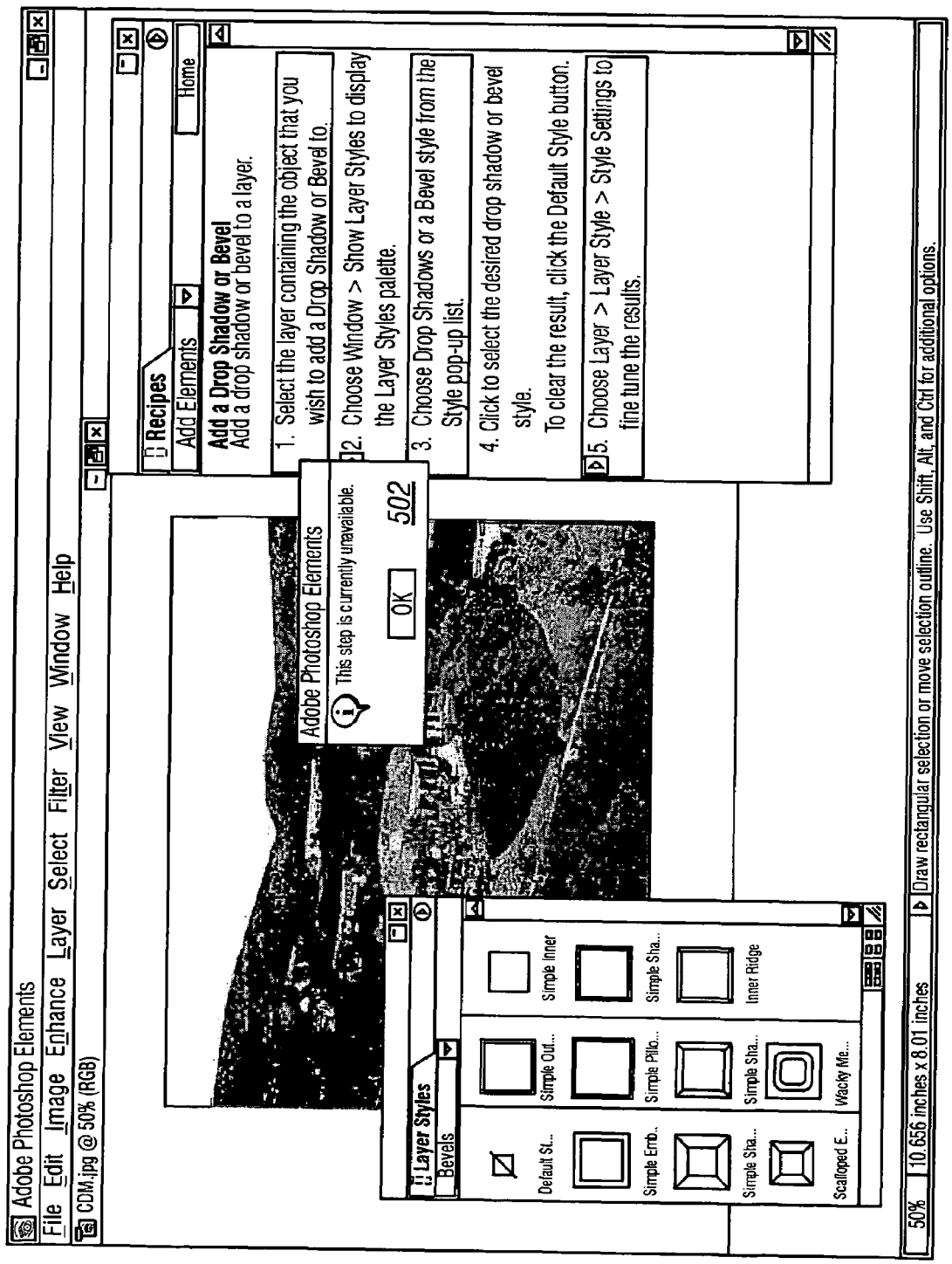
FIG. 5 is a screenshot showing an example of alerting a user when an application cannot be performed by the help facility.
Figure 6:
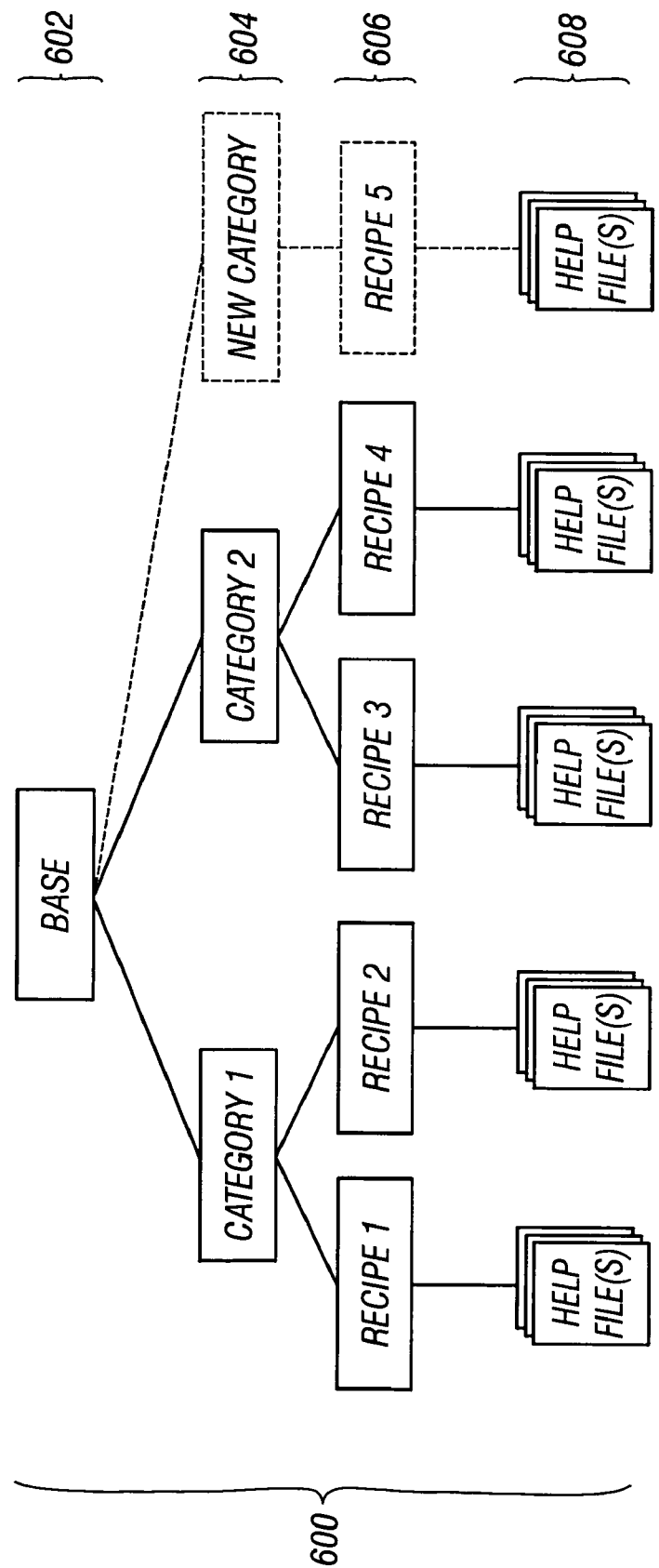
FIG. 6 is a diagram of a file structure that may be used with an extensible help facility.

FIG. 6 is a diagram of a file structure 600 that may be used with an extensible help facility. The file structure 600 may be a hierarchical file structure composed of directories, sub-directories, files and links and may, for example, have four levels as shown in FIG. 5: a base directory level 602, a category directory level 604, a help topic (or recipe) level 606, and a help file level 608. The base directory level 602, which for example could be a directory named "Recipes," represents the highest level in the hierarchy under which the other help facility directories, files and links may be arranged. The category directory level 604 may include one or more sub-directories, for example, each named for a different help topic category such as "Add Elements" or "Rotate and Move." Each category directory 604 in turn may include at the help topic level 606 one or more sub-directories, each corresponding to a specific help topic. For example, the "Rotate and Move" category directory may include three help topic sub-directories named "Move an Object," "Rotate an Image," and "Rotate a Selection." Each help topic sub-directory in turn may include one or more help files 608 that are used to represent the help content (e.g., instructive text and/or image) and associated interactive links such as "Do it for me" buttons.

In one implementation, two help files 608 (e.g., index.html and listing.html) may be used for each help topic or Recipe. In that case, the file index.html may include HTML statements and/or code that collectively define the Recipe's content, layout and interactive links that are presented to the user. The file listing.html may include a link pointing to the corresponding index.html file and specifying the name of the help topic to be displayed to the user in a table of contents.

Upon being launched, and/or upon refreshing its knowledge of the contents of the hierarchical file structure 600, the help facility will traverse the file structure 600 and will use the directory names at levels 604 and 606, and the listing.html files at level 608, to build a table of contents and content dynamically. In particular, the name of each category directory residing in level 604 of the file structure is added to a list of available help categories displayed to the user in a menu (see, e.g., the list 309 of five different Recipe categories displayed in dropdown menu 308 in FIG. 3A). Moreover, the listing.html files in level 608 are used to dynamically generate one or more HTML files at level 606 that identify and point to each of the individual help topic's index.html files. For example, each of Recipe1 and Recipe2 under Category in FIG. 6 will have corresponding index.html and listing.html files. When the help facility traverses the file structure 600, the listing.html files for Recipe1 and Recipe2 will be used to automatically generate another HTML file at level 606 that identifies and points to Recipe1's and Recipe2's respective index.html files.

Because the help facility may dynamically build and update its available help content in the manner described above, new help categories/topics can be added to the help facility, or existing help categories/topics can be modified, with relative ease and simplicity. For example, the help facility content represented in FIG. 6 (containing two help categories having two Recipes a piece) can be expanded simply by adding at level 604 a category directory ("New Category") having a sub-directory ("Recipe5"), which in turn includes associated listing.html and index.html files. When the help facility next traverses the file structure, this New Category of help information will be visible to and accessible by the user.

Figure 7:
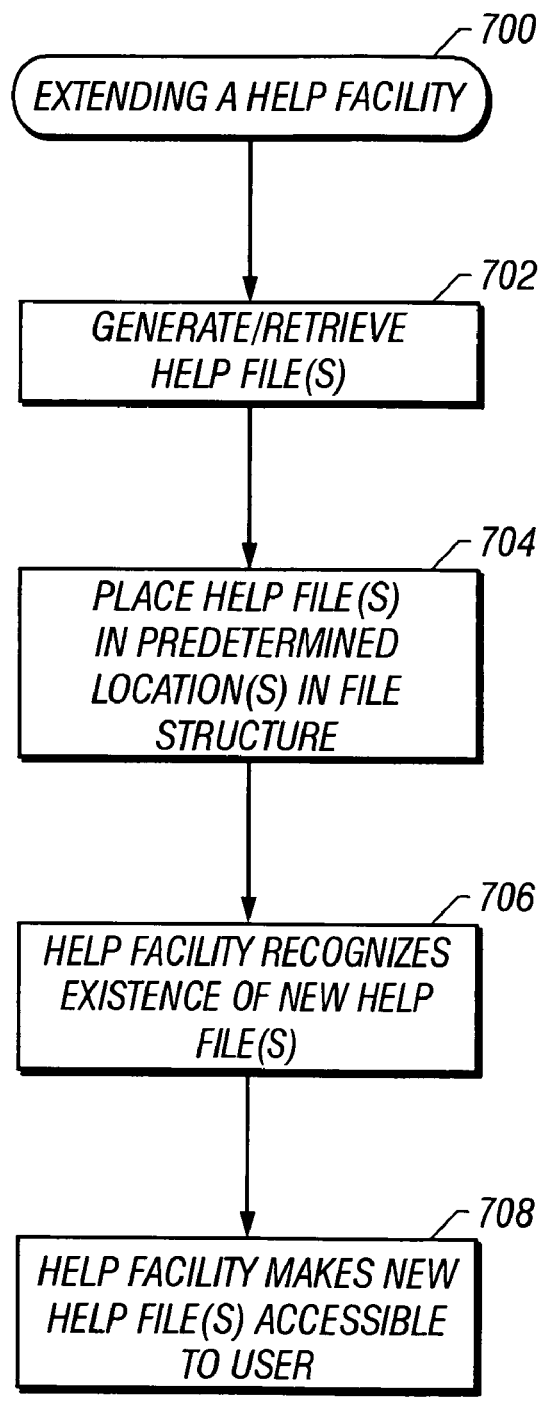
FIG. 7 is a flowchart of a method for extending a help facility.

FIG. 7 is a flowchart of a process 700 that may be used for extending a help facility, for example, to add new help topics and/or to modify existing help topics. First, help content that is to be used to extend the help facility is generated or retrieved (702). Generating help files may be accomplished by an author creating new help files or modifying existing ones. The author can use a standard editing application to generate a help file, potentially having one or more interactive links, using a standard format such as HTML, PDF, Microsoft Word or the like. An interactive link specified by an author can point to an executable or interpretable resource that causes the application to perform one or more operations, for example, a sequence of related operations defined by a macro such as a Photoshop® Action. The macro either can be predefined, e.g., by another author, or can be generated anew.

One method for generating a macro of one or more operations is to create a new Action by recording a series of user activities—a feature available in Adobe Photoshop®. To do so, the author uses various GUI mechanisms such as dialog boxes to specify an Action name, an Action set and to start and stop recording user activities—e.g., selecting menu items, changing application modes, performing operations on images and the like. The recorded activities define the Action, which may be invoked through a specified function key, through the application GUI, or indirectly through the help facility using interactive links. Accordingly, by enabling the generation of new or modified help files and associated macros of application operations in the manner described, authors are provided with a highly flexible and extensible help facility that may be used to customize the help facility for specific contexts or uses.

As an alternative to generating new help content, or in addition, the help facility can be extended by retrieving new or modified help content from an external source, for example, from a website accessible via a network or from a removable medium such as a CD-ROM. Retrieving new help content in this manner can be performed either in response to user commands or actions (e.g., selection of the "Download New Recipes" menu item 311 as shown in FIG. 3A), or transparently to the user, for example, based on the automatic detection of updated material being available at a predetermined URL (universal resource locator) address.

Next, the generated or retrieved help file(s) are placed at predetermined location(s) within the file structure used by the help facility (704). Placement of the help files can be performed manually by a user or author, or can occur automatically, for example, in the event of downloading new help content from an external source such as a website.

Next, the help facility recognizes the existence of new help file(s) in the file structure (706). This recognition can be triggered either by an express user action (e.g., clicking a refresh button in the help facility's GUI) or can occur automatically, for example, by traversing the file structure periodically (e.g., once every 10 seconds) or whenever a change in the file structure is detected.

Finally, the help facility makes the new help content accessible to the user, for example, by updating menus or other displays and/or dynamically building new tables of content, to include the identities of and links to the new content (708).

Figure 8A:
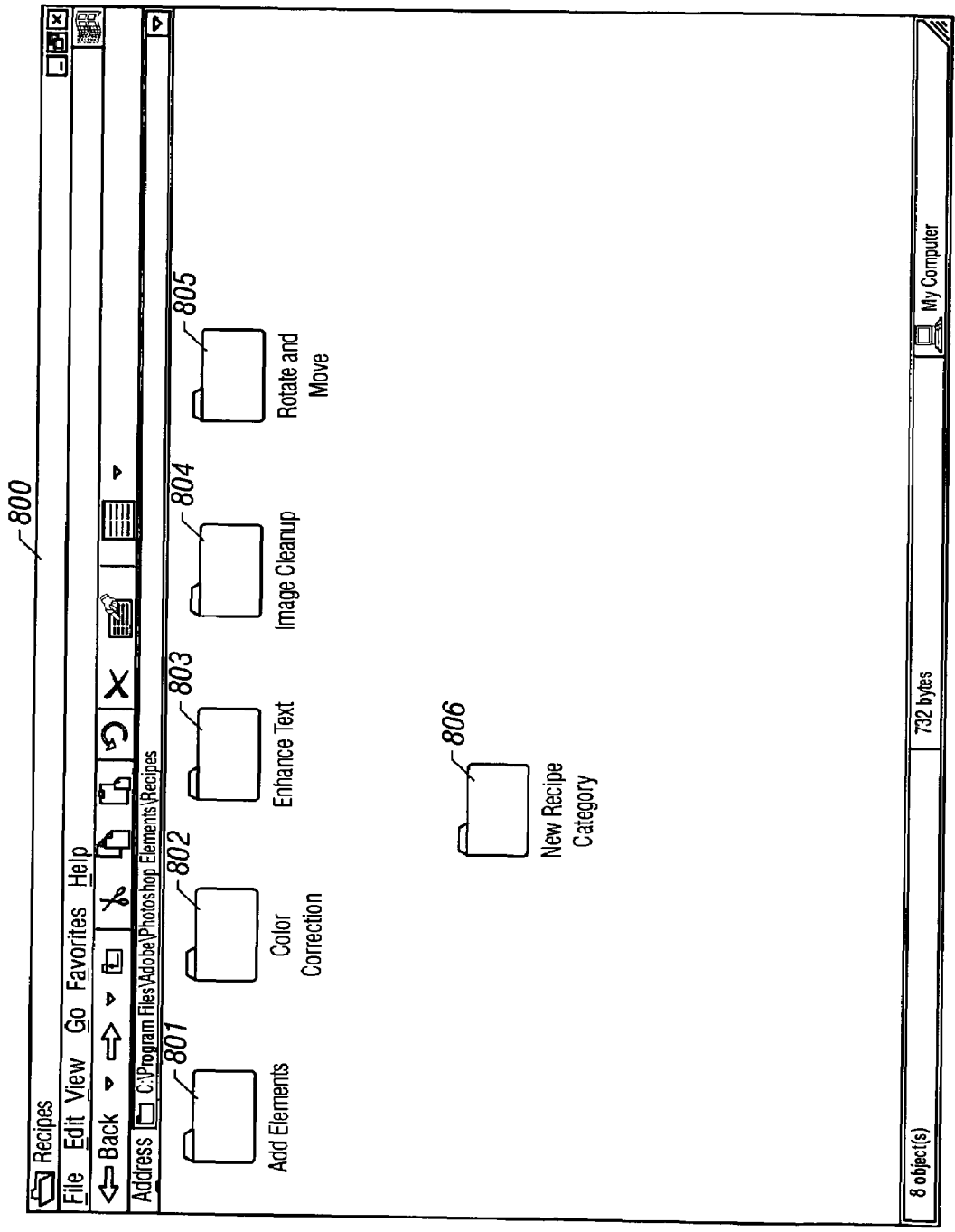
FIGS. 8A-8C are screenshots showing an example of extending a help facility.
Figure 8B:
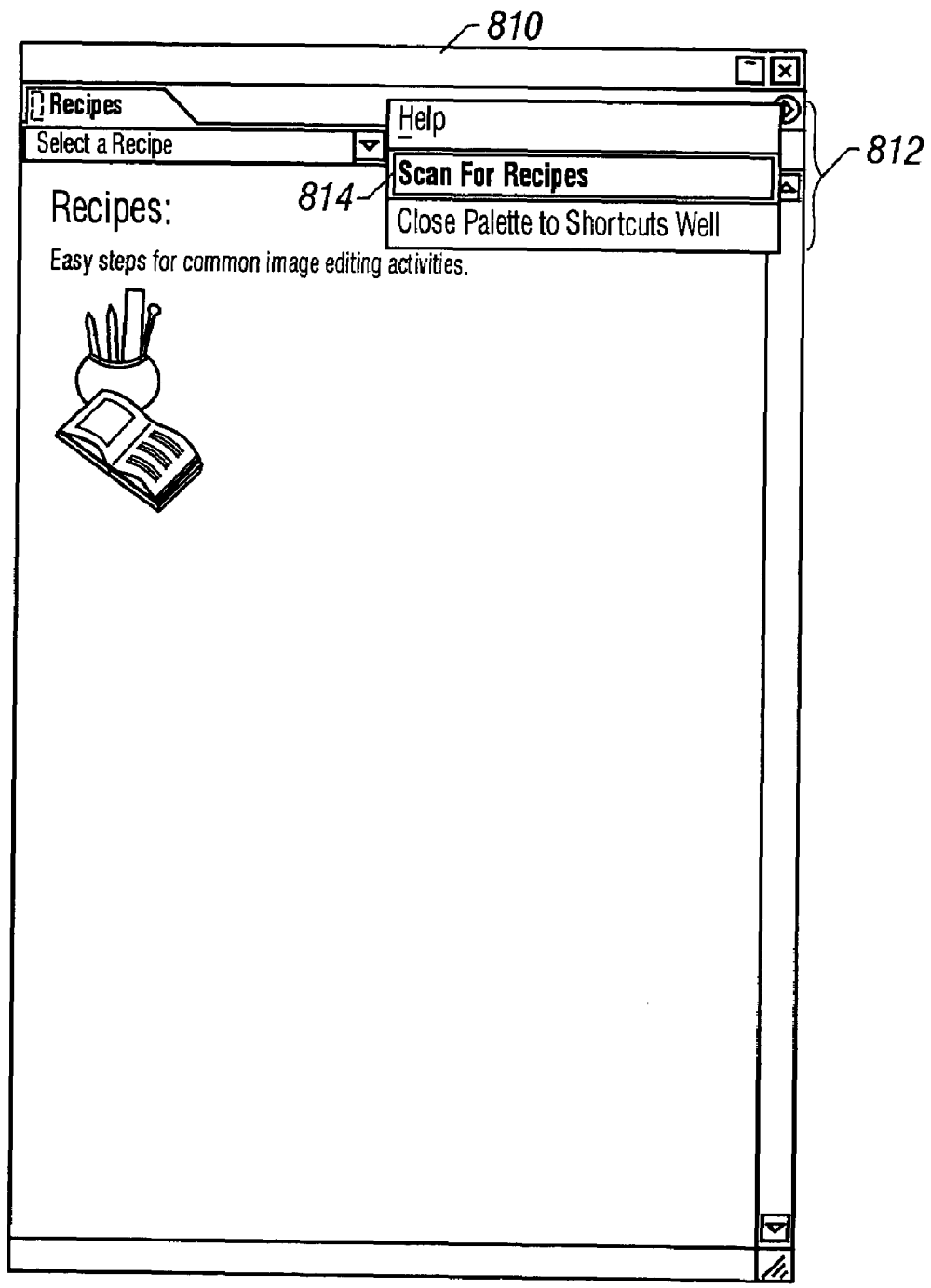
Figure 8C:
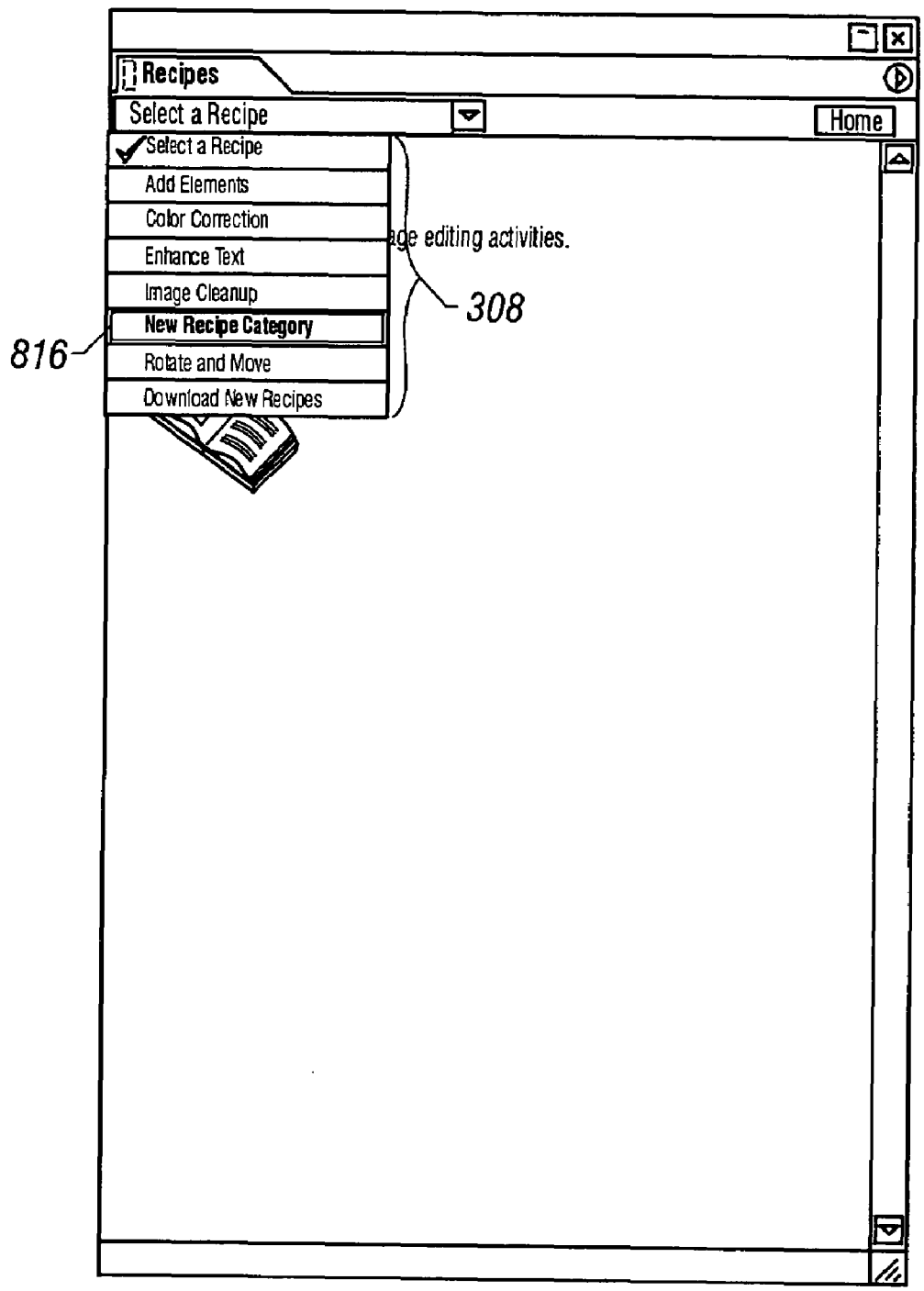

FIGS. 8A-8C are screenshots showing an example of extending a help facility by adding a new category of help information. FIG. 8A shows a screenshot of a window 800 showing the contents of the directory "Recipes," which corresponds to the base level 602 in FIG. 6. Before the new help information category is added, the base level directory includes category directories 801-805, corresponding to the list 309 of five different Recipe categories displayed in dropdown menu 308 in FIG. 3A. In this example, a new category, named "New Recipe Category," has been retrieved or generated and placed in the appropriate predetermined location in the hierarchical file structure. Although not evident from FIG. 8A, the directory "New Recipe Category" contains at least one sub-directory corresponding to an associated Recipe, which in turn includes corresponding index.html and listing-.html files.

FIG. 8B shows a screenshot of the help facility's main window 810 in which a user has selected menu item 814 ("Scan For Recipes") from dropdown menu 812 to cause the help facility to identify new and/or modified help information appearing in the file structure since the help facility's last traversal of the file structure. In response, the help facility traverses the file structure, inserts the names of the category directories located to the dropdown menu 308, and, for each category, dynamically generates an HTML file of the Recipe names under that category, as specified in the Recipe directories' respective listing.html files. As a result, the next time that the user pulls down the dropdown menu 308, as shown in FIG. 8C, the New Recipe Category 816 is displayed and accessible to the user. The help facility accordingly may be extended or updated on-the-fly and without having to terminate and/or re-start the application or the help facility.

Various implementations of the systems and techniques described here may be realized in digital electronic circuitry, integrated circuitry, or in computer hardware, firmware, software, or combinations thereof.

Other embodiments may be within the scope of the following claims.

What is claimed is:

1. A method comprising:
   launching a help facility associated with a computer software application;
   displaying content obtained from a help file containing at least two interactive links in a sequence, each interactive link being associated with at least one user-activated step in the computer software application to perform in connection with a help topic according to the sequence;
   receiving an input from a user activating one of the interactive links having at least one preceding interactive link in the sequence; and
   invoking an operation in the computer software application to effect the at least one user-activated step.

2. A method as in claim 1, wherein the operation is invoked via an application programming interface of the computer software application.

3. A method as in claim 1, further comprising:
determining whether a state of the computer software application is compatible with the at least one user-activated step; and
wherein the operation is invoked only if the state of the computer software program is compatible with the at least one user-activated step.

4. A method as in claim 3, further comprising: informing the user of one or more steps to undertake to place the computer software application in a proper state to perform the operation.

5. A method as in claim 1, further comprising: retrieving the help file from an external source via a communications network.

6. A method as in claim 1, wherein the invoked operation is based on a recorded sequence of actions.

7. A method as in claim 1, wherein the invoked operation corresponds to a menu item in a graphical user interface of the computer software application.

8. A method as in claim 1, wherein the help file specifies content to be presented within the help facility.

9. A help facility for a computer software application stored on a computer readable medium and executable on a computer, the help facility comprising:
one or more software processes configured to perform the following operations:
providing a graphical user interface for communicating with a user;
launching a help facility associated with a computer software application; and
displaying content obtained from a help file containing at least two interactive links in a sequence, each interactive link being associated with at least one user-activated step in the computer software application to perform in connection with a help topic according to the sequence;
receiving an input from the user activating one of the interactive links having at least one preceding interactive link in the sequence; and
invoking an operation in the computer software application to effect the at least one user-activated step.

10. A help facility as in claim 9, wherein the operation is invoked via an application programming interface of the computer software application.

11. A help facility as in claim 9, wherein the one or more software processes are further configured to perform the following operations:
determining whether a state of the computer software application is compatible with the at least one user-activated step; and
wherein the operation is invoked only if the state of the computer software program is compatible with the at least one user-activated step.

12. A help facility as in claim 11, wherein the one or more software processes are further configured to perform the following operation: informing the user of one or steps to undertake to place the computer software application in a proper state to perform the operation.

13. A help facility as in claim 9, wherein the one or more software processes are further configured to perform the following operation: retrieving the help file from an external source via a communications network.

14. A help facility as in claim 9, wherein the invoked operation is based on a recorded sequence of actions.

15. A help facility as in claim 9, wherein the invoked operation corresponds to a menu item in a graphical user interface of the computer software application.

16. A help facility as in claim 9, wherein the one or more software processes are further configured to perform the following operation: enabling a generation of one or more help files that specify content to be presented within the help facility.

17. Machine-readable instructions, embodied in a tangible medium, for causing a machine to perform operations comprising:
launching a help facility associated with a computer software application;
displaying content obtained from a help file containing at least two interactive links in a sequence, each interactive link being associated with at least one user-activated step in the computer software application to perform in connection with a help topic according to the sequence;
receiving an input from a user activating one of the interactive links having at least one preceding interactive link in the sequence; and
invoking an operation in the computer software application to effect the at least one user-activated step.

18. Machine-readable instructions as in claim 17, wherein the operation is invoked via an application programming interface of the computer software application.

19. Machine-readable instructions as in claim 17, for causing the machine to perform further operations comprising:
determining whether a state of the computer software application is compatible with the at least one user-activated step; and
wherein the operation is invoked only if the state of the computer software program is compatible with the at least one user-activated step.

20. Machine-readable instructions as in claim 19, for causing the machine to perform further operations comprising: informing the user of one or steps to undertake to place the computer software application in a proper state to perform the operation.

21. Machine-readable instructions as in claim 17, for causing the machine to perform further operations comprising: retrieving the help file from an external source via a communications network.

22. Machine-readable instructions as in claim 17, wherein the invoked operation is based on a recorded sequence of actions taken.

23. Machine-readable instructions as in claim 17, wherein the invoked operation corresponds to a menu item in a graphical user interface of the computer software application.

24. Machine-readable instructions as in claim 17, further comprising: enabling a generation of one or more help files that specify content to be presented within the help facility.

25. A system including at least one computer comprising:
a computer software application configured to launch a help facility associated with the computer software application;
an application window configured to display content obtained from a help file containing at least two interactive links in a sequence, each interactive link being associated with at least one user-activated step in the computer software application to perform in connection with a help topic according to the sequence; and
a help facility configured to:
receive an input from a user activating one of the interactive links having at least one preceding interactive link in the sequence, and invoke an operation in the computer software application to effect the at least one user-activated step.

26. The system of claim 25, wherein the operation is invoked via an application programming interface of the computer software application.

27. The system of claim 25, wherein the help facility is further configured to:
determine whether a state of the computer software application is compatible with the at least one user-activated step; and
wherein the operation is invoked only if the state of the computer software program is compatible with the at least one user-activated step.

28. The system of claim 27, wherein the help facility is further configured to inform the user of one or more steps to undertake to place the computer software application in a proper state to perform the operation.

29. The system of claim 25, wherein the help facility is further configured to retrieve the help file from an external source via a communications network.

30. The system of claim 25, wherein the invoked operation is based on a recorded sequence of actions.

31. The system of claim 25, wherein the invoked operation corresponds to a menu item in a graphical user interface of the computer software application.

32. The system of claim 25, wherein the help file specifies content to be presented within the help facility.

* * * * *

UNITED STATES PATENT AND TRADEMARK OFFICE
CERTIFICATE OF CORRECTION

PATENT NO.       : 7,415,696 B2                                     Page 1 of 1
APPLICATION NO.  : 11/293528
DATED            : August 19, 2008
INVENTOR(S)      : Gary B. Cohen, Michael J. Leavy and Michael D. Scarafone It is certified that error appears in the above-identified patent and that said Letters Patent is hereby corrected as shown below:

Claim 12:
    column 11, line 59:
        delete "of one or steps", and replace with --of one or more steps--

Signed and Sealed this

Third Day of February, 2009

JOHN DOLL
*Acting Director of the United States Patent and Trademark Office*